United States Patent
Chen et al.

(10) Patent No.: US 8,943,342 B2
(45) Date of Patent: Jan. 27, 2015

(54) POWER SUPPLY CIRCUIT EMPLOYED IN COMPUTER FOR PERFORMING DIFFERENT STANDBY MODES

(75) Inventors: Chun-Sheng Chen, New Taipei (TW); Hua Zou, Shenzhen (CN); Feng-Long He, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 368 days.

(21) Appl. No.: 13/461,737

(22) Filed: May 1, 2012

(65) Prior Publication Data
US 2013/0103963 A1    Apr. 25, 2013

(30) Foreign Application Priority Data
Oct. 21, 2011  (CN) .......................... 2011 1 0322688

(51) Int. Cl.
*G06F 1/32* (2006.01)
*G06F 1/26* (2006.01)

(52) U.S. Cl.
CPC ................ *G06F 1/26* (2013.01); *G06F 1/3296* (2013.01); *Y02B 60/32* (2013.01)
USPC ............................. 713/320; 713/300; 713/324

(58) Field of Classification Search
None
See application file for complete search history.

(56) References Cited

U.S. PATENT DOCUMENTS

| | | | |
|---|---|---|---|
| 2008/0168288 A1* | 7/2008 | Jia et al. | 713/323 |
| 2010/0125743 A1* | 5/2010 | Yeh et al. | 713/320 |
| 2011/0197084 A1* | 8/2011 | Xi | 713/323 |

FOREIGN PATENT DOCUMENTS

| | | |
|---|---|---|
| TW | I292973 B | 1/2008 |
| TW | I311701 B | 7/2009 |
| TW | 201042441 A1 | 12/2010 |
| TW | 201101012 A1 | 1/2011 |

* cited by examiner

*Primary Examiner* — Paul Yanchus, III
(74) *Attorney, Agent, or Firm* — Novak Druce Connolly Bove + Quigg LLP

(57) ABSTRACT

A power supply circuit includes a basic input output system (BIOS), a super input output (SIO), a bivibrator, a logical selector, and a voltage converter. The basic input output system (BIOS) is configured for storing different operation modes of a computer. The super input output (SIO) is configured for generating standby mode signals according to the different operation modes. The bivibrator is configured for generating a reference signal when upon receiving a clock signal from the computer when the computer is turned on. The logical selector is configured for generating a standby control signal in response to the reference signal and one of the standby mode signals. The voltage converter is configured for transforming the first standby voltage into a second standby voltage to drive the SIO. The SIO receives the second standby voltage before the clock signal is delayed and provided to the SIO to start the computer.

19 Claims, 2 Drawing Sheets

POWER SUPPLY CIRCUIT EMPLOYED IN COMPUTER FOR PERFORMING DIFFERENT STANDBY MODES

BACKGROUND

1. Technical Field

The present disclosure relates to a power supply circuit employed in a computer to enable the computer to enter different standby modes when the computer is turned off.

2. Description of Related Art

When a computer is turned off by a user, a power supply circuit of the computer still generates and provides at least two standby voltages, such as 3V and 5V, to important circuits of the computer according to the advanced configuration and power interface (ACPI) specification. Thus, the normal computer is power-wasting.

Therefore, a new power supply circuit is needed.

BRIEF DESCRIPTION OF THE DRAWINGS

The components in the drawings are not necessarily drawn to scale, the emphasis instead being placed upon clearly illustrating the principles of at least one embodiment. In the drawings, like reference numerals designate corresponding parts throughout the various views.

DETAILED DESCRIPTION

Reference will now be made to the drawings to describe various embodiments in detail.

Figure 1:
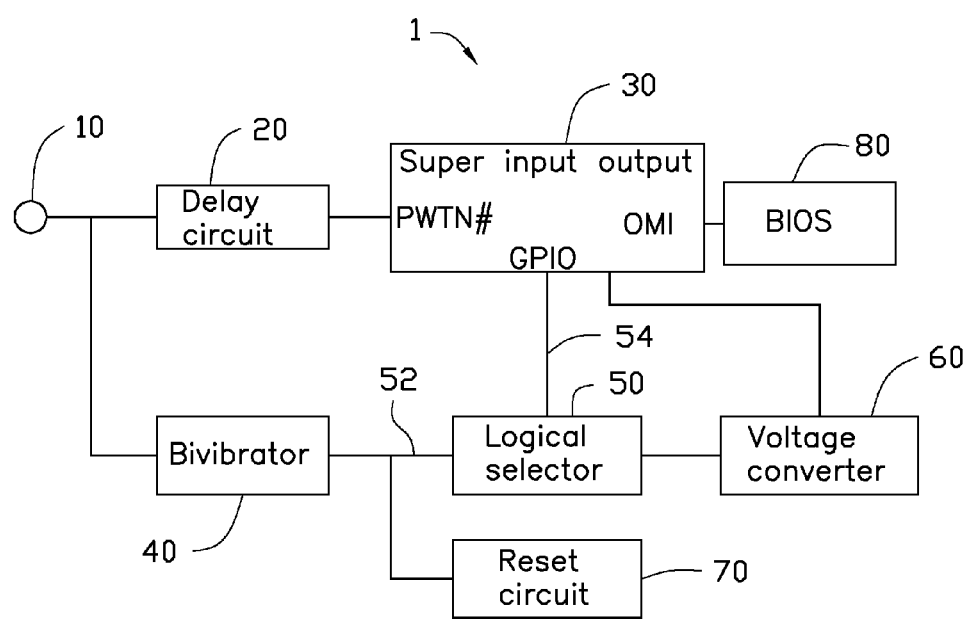
FIG. 1 is a schematic block diagram of a power supply circuit for a computer according to one embodiment of the present disclosure.

Referring to FIG. 1, a schematic block diagram of a power supply circuit 1 for a computer according to one embodiment of the present disclosure is shown. The power supply circuit 1 includes a clock input 10, a delay circuit 20, a super input output (SIO) 30, a bivibrator 40, a logical selector 50, a voltage converter 60, a reset circuit 70, and a basic input output system (BIOS) 80.

In one embodiment, a first standby voltage is generated by an external power circuit of the computer when the computer is off or on. In one embodiment, the first standby voltage is a 5V direct current (DC) voltage to drive the voltage converter 60 and the logical selector 50 when the computer is off or on.

The clock input 10 is configured to receive a clock signal. In one embodiment, the clock signal is a pulse signal and generated by an external clock circuit of the computer from the moment that the computer is turned on. The clock signal is configured to start the computer and defined as a start signals for different integrated circuits (ICs) employed in the computer.

The delay circuit 20 is configured to delay the clock signal and provide the delayed clock signal to the SIO 30.

The BIOS 80 is used to store different operation modes of the computer, for example a normal work mode, a normal standby mode, a super standby mode, and an auto standby mode. The computer may be selected to work in or enter the normal work mode, the normal standby mode, the super standby mode, or the auto standby mode according to demand of a user. Each operation mode of the computer can be performed or entered by pressing a physical power button of the computer or executing a program of the computer using a mouse.

The SIO 30 includes a clock pulse input PWTN#, an operation mode input OMI, and a general purpose input output GPIO. The clock pulse input PWTN# is configured to receive the delayed clock signal from the delay circuit 20. The standby control input SCI is configured to receive the operation modes from the BIOS 80, for example the normal work mode, the normal standby mode, the super standby mode, or the auto standby mode. The SIO 30 is configured to generate a normal standby signal, a super standby signal, and an auto standby signal when the computer respectively enters the normal standby mode, the super standby mode, and the auto standby mode. The normal standby signal, the super standby signal and the auto standby signal are defined as standby mode signals. The general purpose input output GPIO is configured to output the standby mode signals to the logical selector 50. In one embodiment, the normal standby signal is defined as a first voltage (logic 1) from the moment the power button of the computer is pressed. The super standby signal is defined as a second voltage (logic 0) from the moment the power button of the computer is pressed. The auto standby signal is defined as the first voltage (logic 1) in a predetermined time from the moment the power button of the computer is pressed and defined as the second voltage (logic 0) after the power button of the computer is pressed and the predetermined time is passed. In one embodiment, the predetermined time can be thirty seconds, two minutes or five minutes.

In one embodiment, the SIO 30 is a south bridge chip and configured to control communications between different input/output (I/O) devices of the computer in according with the delayed clock signal. In one embodiment, the input/output devices of the computer, for example, includes peripheral component interconnect (PCI) devices, universal serial bus (USB) devices, local area network (LAN) devices, integrated device electronics (IDE) devices, serial advanced technology attachment (SATA) devices.

The bivibrator 40 is configured to receive the clock signal and transform the clock signal into a reference voltage and provide the reference voltage to the logical selector 5. In one embodiment, the bivibrator 40 generates the first voltage (logic 1) as the reference voltage when the bivibrator 40 receives the clock signal, and generates the second voltage (logic 0) as the reference voltage when the bivibrator 40 does not receive the clock signal.

The reset circuit 70 is configured to pull down the reference voltage from the first voltage (logic 1) into the second voltage (logic 0) when the computer normally works. In one embodiment, a central processing unit (CPU) of the computer sends an enable signal PWOK (logic 1) to the reset circuit 70 when the computer normally works to allow the reset circuit to 70 normally work and pull down the reference voltage.

The logical selector 50 includes a first input 52 configured to receive the reference voltage, a second input 54 configured to receive the standby mode signals, and a standby control terminal 53 configured to generate and provide a standby control signal to the voltage converter 60 in response to the reference voltage and one of the standby mode signals.

The voltage converter 60 receives the first standby voltage from the external power circuit and transforms the first standby voltage into a second standby voltage under control of the standby control signal. In this embodiment, the second standby voltage is used to drive the SIO 30 for its normal operation. In one embodiment, the second standby voltage is also used to drive other ICs, for example the central processing unit (CPU), employed in the computer for normal operation. In one embodiment, the second standby voltage is a 3V DC voltage.

In a first operation, when the power button of the computer is pressed to let the computer enter the normal standby mode, the normal standby signal is generated as the standby mode signal by the SIO 30 and provided to the logical selector 50. In this embodiment, the logical selector 50 receives the first voltage (logic 1) as the normal standby signal from the moment the power button is pressed. At the same time, the reference voltage which is still pulled down into the second voltage (logic 0) by the reset circuit 70 is provided to the logical selector 50. Under this condition, the logical selector 50 generates the first voltage (logic 1) as the standby control signal to enable the voltage converter 60 to generate the second standby voltage. That is, the second standby voltage is provided when the computer works in the normal standby mode.

When the power button of the computer is pressed again to turn on the computer from the normal standby mode, the clock signal is received by the clock input 10 and provide to the delay circuit 20, the delay circuit 20 generates and provides the delayed clock signal to the SIO 30. Thus, the SIO 30 can control the computer to fast wake up and change its work state from the normal standby mode into the normal work mode because the SIO 30 and most of important ICs of the computer are always driven by the second standby voltage. In one embodiment, the SIO 30 generates the first voltage (logic 1) as the standby mode signal in the first operation mode.

In a second operation, when the power button of the computer is pressed to let the computer enter the super standby mode, the super standby signal is generated as the standby mode signal by the SIO 30 and provided to the logical selector 50. In this embodiment, the logical selector 50 receives the second voltage (logic 0) as the super standby signal from the moment the power button is pressed. At the same time, the reference voltage which is still pulled down into the second voltage (logic 0) by the reset circuit 70 is provided to the logical selector 50. Under this condition, the logical selector 50 generates the second voltage (logic 0) as the standby control signal to control the voltage converter 60 to stop generating the second standby voltage. That is, the second standby voltage is not generated for saving more power when the computer works in the super standby mode.

When the power button of the computer is pressed again to turn on the computer from the super standby mode, the clock signal is received by the clock input 10 and provided to the bivibrator 40, the bivibrator 40 generates and provides the first voltage (logic 1) as the reference voltage to the logical selector 50. Under this condition, the logical selector 50 generates the first voltage (logic 1) as the standby control signal to enable the voltage converter 60 to generate and provide the second standby voltage to drive the SIO 30 and the important ICs before the SIO 30 receives the delayed clock signal. After the delay circuit 20 generates and provides the delayed clock signal to the SIO 30, the SIO 30 can control the computer to wake up and change its work state from the super standby mode into the normal work mode. After the computer normally works, the enable signal PWOK is generated to control the reset circuit 70 to pull down the reference voltage and also to control the SIO 30 to generate the first voltage (logic 1) as the standby mode signal.

In a third operation, when the power button of the computer is pressed to let the computer enter the auto standby mode, the auto standby signal is generated as the standby mode signal by the SIO 30 and provided to the logical selector 50. In this embodiment, the logical selector 50 receives the first voltage (logic 1) in the predetermined time from the moment the power button is pressed and receives the second voltage (logic 0) after the predetermined time is passed as the auto standby signal. At the same time, the reference voltage which is still pulled down into the second voltage (logic 0) by the reset circuit 70 is provided to the logical selector 50. Under this condition, the logical selector 50 generates and provides a standby control signal which has the same wave form of the auto standby signal to the voltage converter 60. In this embodiment, both the auto standby signal and the standby control signal include the first voltage (logic 1) in the predetermined time to enable the computer work in a normal standby mode and the second voltage (logic 0) to enable the computer work in a super standby mode after the predetermined time is passed. That is, when the computer is turned off to enter the auto standby mode, the computer first enters the normal standby mode for waiting a user to fast turn on/wake up the computer again, if the computer is not turned on/waked up in the predetermined time, the computer then enters the super standby mode to saving more power when the predetermined time is passed.

When the power button of the computer is pressed again to turn on the computer from the auto standby mode, if the computer works in the normal standby mode, the computer can be turned on like the first operation, and if the computer works in the super standby mode, the computer can turned on like the second operation.

Figure 2:
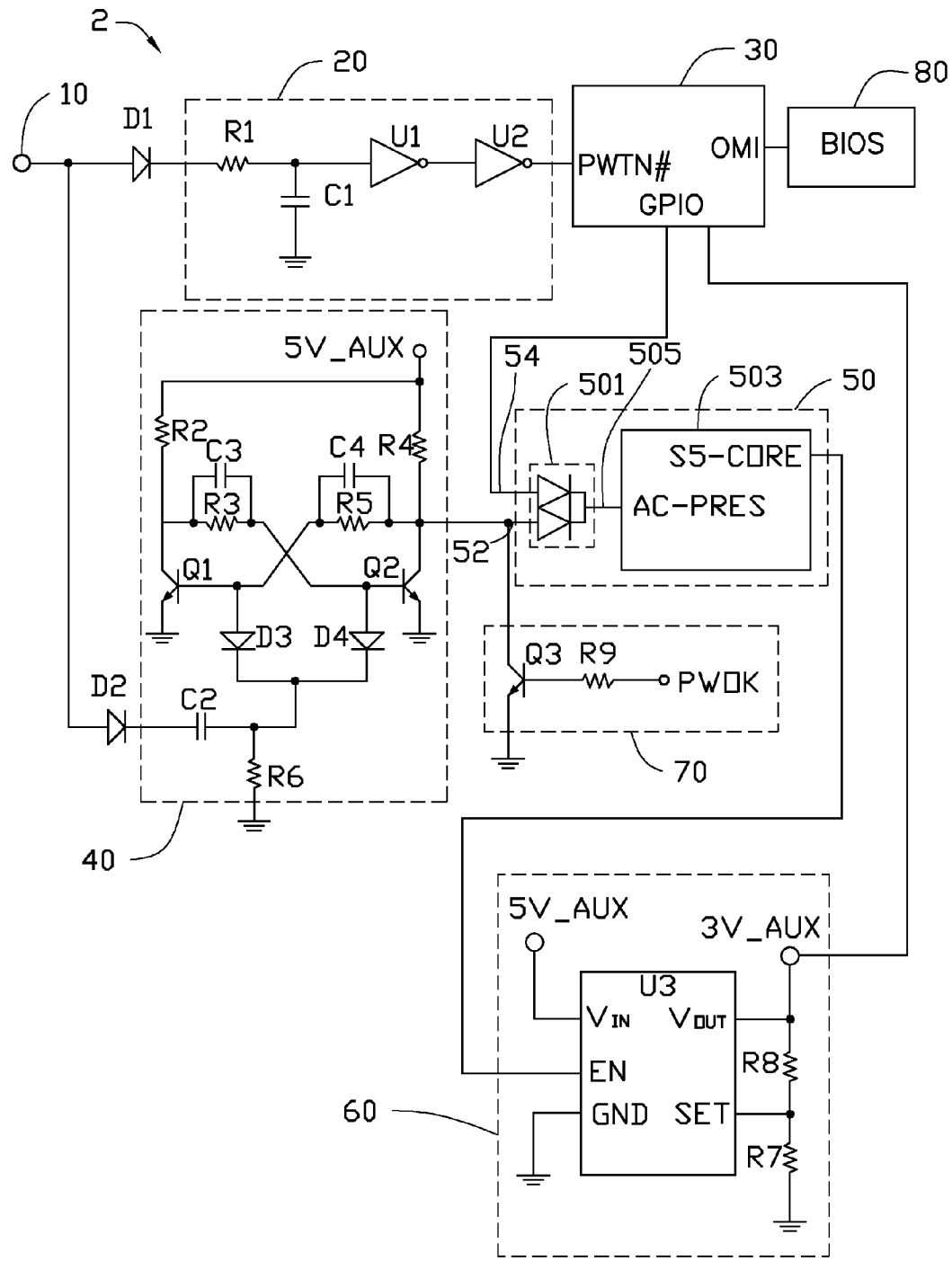
FIG. 2 is a schematic circuit diagram of a power supply circuit for a computer according to one embodiment of the present disclosure.

Referring to FIG. 2, a schematic circuit diagram of a power supply circuit 2 employed in a computer according to one embodiment of the present disclosure is shown. The power supply circuit 2 has the same operations or functions to the power supply circuit 1. The power supply circuit 2 differs from the power supply circuit 1 as detailed below.

The clock input 10 is connected in series to the delay circuit 20 via a forward biased first diode D1. The clock input 10 is also connected in series to the bivibrator 40 via a forward biased second diode D2.

The delay circuit 20 includes a first resistor R1, a first Schmitt trigger U1, and a second Schmitt trigger U2 connected in series in that order. The delay circuit 20 further includes a first capacitor C1 connected between an input of the first Schmitt trigger U1 and ground. The cathode of the first diode D1 is connected to the first resistor R1.

The bivibrator 40 includes a third diode D3, a fourth diode D4, first to fourth capacitors C2-C4, a first transistor Q1, a second transistor Q2, and second to sixth resistors R2-R6. Collectors of the first and the second transistors Q1 and Q2 are connected to the first standby voltage 5V_AUX. Emitters of the first and the second transistors Q1 and Q2 are grounded. The second resistor R2, the third resistor R3, the forward biased fourth diode D4 and the sixth resistor R6 are connected in series between the first standby voltage and ground. The third capacitor is connected in parallel with the third resistor R3. Base of the second transistor Q2 is connected to the anode of the fourth diode D4. The fourth resistor R4, the fifth resistor R5, the forward biased third diode D3, and the sixth resistor R6 is also connected between the first standby voltage and ground. The fourth capacitor C4 is connected in parallel with the fifth resistor R5. Base of the first transistor Q1 is connected to the anode of the third diode D3. The cathodes of the third and the fourth diodes D3 and D4 are connected to the cathode of the second diode D2 via the second capacitor C2 to receive the clock signal. In this embodiment, the collector of the second transistor Q2 is defined as output of the bivibrator 40 to output the reference voltage. In this embodiment, the first and the second transistors Q1 and Q2 are npn bipolar junction transistors. In alternative embodiment, the first and the second transistors Q1 and Q2 may be n-channel metal oxide semiconductor (NMOS) transistors.

The logical selector 50 includes an OR gate 501 and a detector 503. The OR gate 501 includes a first logic input defined as the first input 52 of the logical selector 50, a second logic input defined as the second input 54 of the logical selector 50, and a logic output 505. The detector 503 includes a detect input AC-PRES connected to the logic output 505 and a detect output S5-CORE defined as the standby control terminal 53 of the logical selector 50. The detector 503 is configured to output a standby control signal which is provided from the logic output 505 of the OR gate 501 via the detect output S5-CORE. In one embodiment, the detector 503 may be a Fusion Controller Hub (FCH).

The voltage converter 60 includes a DC to DC chip U3, a seventh resistor R7 and an eighth resistor R8. In this embodiment, the DC to DC chip U3 includes a voltage input Vin connected to the first standby voltage 5V_AUX, a voltage output Vout to output the second standby voltage 3V_AUX, an enable pin EN to the logical selector 50 for receiving the standby control signal, a ground pin GND, and an initial pin SET. The eighth resistor R8 is connected between the voltage output Vout and the initial pin SET. The initial pin SET is grounded via the seventh resistor R7.

The reset circuit 70 includes a third transistor Q3 and a ninth resistor. Collector of the third transistor Q3 is connected to the collector of the second resistor Q2 and the first input 52 of the logical selector 50. Emitter of the third transistor Q3 is grounded. Base of the third transistor connected to an external circuit, for example a CPU of the computer, to receive the enable signal PWOK. In different embodiments, the third transistor Q3 can be a npn bipolar Junction transistor or an NMOS transistor.

It is to be understood that even though numerous characteristics and advantages of the present embodiments have been set forth in the foregoing description, with details of the structures and functions of the embodiments, the disclosure is illustrative only; and that changes may be in detail, especially in matters of shape, size, and arrangement of parts, within the principles of the embodiments, to the full extent indicated by the broad general meaning of the terms in which the appended claims are expressed.

What is claimed is:

1. A power supply circuit employed in a computer, comprising:
   a basic input output system (BIOS) configured for storing different operation modes of the computer;
   a super input output (SIO) configured for generating standby mode signals according to the different operation modes;
   a bivibrator configured for generating a reference signal when upon receiving a clock signal from the computer when the computer is turned on;
   a logical selector configured for generating a standby control signal in response to the reference signal and one of the standby mode signals; and
   a voltage converter configured for transforming the first standby voltage into a second standby voltage to drive the SIO in response to the standby control signal, wherein the SIO receives the second standby voltage before the clock signal is delayed and provided to the SIO to turn on the computer.

2. The power supply circuit of claim 1, further comprising a delay circuit configured for delaying the clock signal.

3. The power supply circuit of claim 2, wherein the delay circuit comprises a first resistor, a first Schmitt trigger, and a second Schmitt trigger connected in series in that order, the delay circuit further comprises a first capacitor connected between an input of the first Schmitt trigger and ground.

4. The power supply circuit of claim 3, further comprising a clock input connected in series to the delay circuit via a forward biased first diode, the clock input is also connected in series to the bivibrator via a forward biased second diode.

5. The power supply circuit of claim 4, wherein the bivibrator generates a first voltage as the reference voltage when the bivibrator receives the clock signal, and generates the second voltage as the reference voltage when the bivibrator does not receive the clock signal, wherein the first voltage and second voltage correspond to logic 1 and logic 0 respectively.

6. The power supply circuit of claim 4, wherein the bivibrator comprises a third diode, a fourth diode, first to fourth capacitors, a first transistor, a second transistor, and second to sixth resistors, collectors of the first and the second transistors are connected to the first standby voltage, emitters of the first and the second transistors are grounded, the second resistor, the third resistor, the forward biased fourth diode and the sixth resistor are connected in series between the first standby voltage and ground, the third capacitor is connected in parallel with the third resistor, base of the second transistor is connected to the anode of the fourth diode, the fourth resistor, the fifth resistor, the forward biased third diode, and the sixth resistor is connected between the first standby voltage and ground, the fourth capacitor is connected in parallel with the fifth resistor, base of the first transistor is connected to the anode of the third diode, the cathodes of the third and the fourth diodes are connected to the cathode of the second diode via the second capacitor, the collector of the second transistor is configured to output the reference voltage.

7. The power supply circuit of claim 6, wherein the first and the second transistors are npn bipolar junction transistors.

8. The power supply circuit of claim 6, wherein the logical selector comprises an OR gate and a detector, the OR gate comprises a first logic input configured for receiving the reference signal, a second logic input configured for receiving the standby mode signals, and a logic output configured for outputting the standby control signal to the voltage converter via the detector.

9. The power supply circuit of claim 8, wherein the detector is a fusion controller hub (FCH).

10. The power supply circuit of claim 8, wherein the voltage converter is a DC to DC chip and comprises an enable pin configured for receiving the standby control signal, a voltage input configured for receiving the first standby voltage, a voltage output configured for outputting the second standby voltage.

11. The power supply circuit of claim 9, wherein the voltage converter further comprises initial pin, a ground pin, a seventh resistor and an eighth resistor, the initial pin is grounded via the seventh resistor, and the eight resistor is connected between the between the voltage output and the initial pin.

12. The power supply circuit of claim 11, further comprising a reset circuit configured to pull down the reference voltage from the first voltage into the second voltage when the computer normally works, wherein the first voltage and second voltage correspond to logic 1 and logic 0 respectively.

13. The power supply circuit of claim 11, wherein the reset circuit comprises a third transistor and a ninth resistor, collector of the third transistor is connected to the first input of the logical selector, emitter of the third transistor is grounded, base of the third transistor configured for receiving an enable signal.

14. The power supply circuit of claim 1, wherein the operation modes of the computer comprises a normal work mode, a normal standby mode, a super standby mode, and an auto standby mode.

15. The power supply circuit of claim 14, wherein the standby mode signals comprises a normal standby signal, a super standby signal, and an auto standby signal, the SIO generates the normal standby signal when the computer enters the normal standby mode, the SIO generates the super standby signal when the computer enters the super standby mode, and the SIO generates the auto standby signal when the computer enters the auto standby mode.

16. The power supply circuit of claim 15, wherein voltage converter generates the second standby voltage in response to the normal standby signal when the computer enters the normal standby mode.

17. The power supply circuit of claim 15, wherein voltage converter stops generating the second standby voltage in response to the super standby signal when the computer enters the super standby mode.

18. The power supply circuit of claim 15, wherein voltage converter generates the second standby voltage in a predetermined time and stops generating the second standby voltage after the predetermined time is passed when the computer enters the auto standby mode, in response to the auto standby signal.

19. The power supply circuit of claim 18, the predetermined time is selected from the group consisting of thirty seconds, two minutes, and five minutes.

\* \* \* \* \*